United States Patent
Appel et al.

(10) Patent No.: US 11,072,718 B2
(45) Date of Patent: Jul. 27, 2021

(54) WRITING, MARKING AND/OR DRAWING LIQUID FOR CAPILLARY SYSTEMS, ESPECIALLY FOR APPLICATOR IMPLEMENTS HAVING A CAPILLARY SYSTEM, AND APPLICATOR IMPLEMENT

(71) Applicant: FABER-CASTELL AG, Stein (DE)

(72) Inventors: Tatiana Appel, Oberasbach (DE); Baukis Heuler, Nuremberg (DE); Gerhard Lugert, Nuremberg (DE)

(73) Assignee: Faber-Castell AG, Stein (DE)

( * ) Notice: Subject to any disclaimer, the term of this patent is extended or adjusted under 35 U.S.C. 154(b) by 4 days.

(21) Appl. No.: 16/740,692

(22) Filed: Jan. 13, 2020

(65) Prior Publication Data
US 2020/0224045 A1    Jul. 16, 2020

(30) Foreign Application Priority Data

Jan. 11, 2019 (EP) .................... 19151443

(51) Int. Cl.
| | | |
|---|---|---|
| *C09D 11/17* | (2014.01) | |
| *B43K 1/00* | (2006.01) | |
| *B43K 1/01* | (2006.01) | |
| *B43K 1/12* | (2006.01) | |

(52) U.S. Cl.
CPC .............. *C09D 11/17* (2013.01); *B43K 1/003* (2013.01); *B43K 1/01* (2013.01); *B43K 1/12* (2013.01)

(58) Field of Classification Search
CPC .......... C09D 11/17; B43K 1/003; B43K 1/01; B43K 1/12
See application file for complete search history.

(56) References Cited

U.S. PATENT DOCUMENTS

| 6,350,795 B1* | 2/2002 | Breton | C08K 5/21 523/160 |
| 2009/0257816 A1* | 10/2009 | Czubarow | B43K 8/02 401/198 |
| 2018/0066156 A1* | 3/2018 | Schwarz | C09D 193/04 |
| 2019/0315982 A1* | 10/2019 | Appel | A61K 8/87 |
| 2020/0062977 A1* | 2/2020 | Schwarz | B43K 8/03 |

FOREIGN PATENT DOCUMENTS

| CN | 105153805 A | 12/2015 |
| CN | 108841246 A | 11/2018 |
| GB | 781808 A | 8/1957 |
| JP | H04270771 A | 9/1992 |

\* cited by examiner

*Primary Examiner* — J C Jacyna

(74) *Attorney, Agent, or Firm* — Laurence A. Greenberg; Werner H. Stemer; Ralph E. Locher

(57) ABSTRACT

An aqueous writing, marking and/or drawing liquid is configured for capillary systems, more particularly for applicator implements having a capillary system. The liquid has a viscosity of less than 50 mPas, more particularly less than 20 mPas (Brookfield, 20° C., cone-plate CPE-40). The liquid contains a wetting agent, graphite having a carbon content of between 95 and 99.9 wt %, an ash content of between 0.1 and 5 wt %, and a particle size ≤20 μm at D90, and at least one release agent, more particularly in a concentration of 2 to 15 wt %. The release agent contains barium sulfate and/or an aqueous, highly mobile, nonsedimenting colloidal dispersion of nanoparticulate silicon dioxide particles.

18 Claims, 1 Drawing Sheet

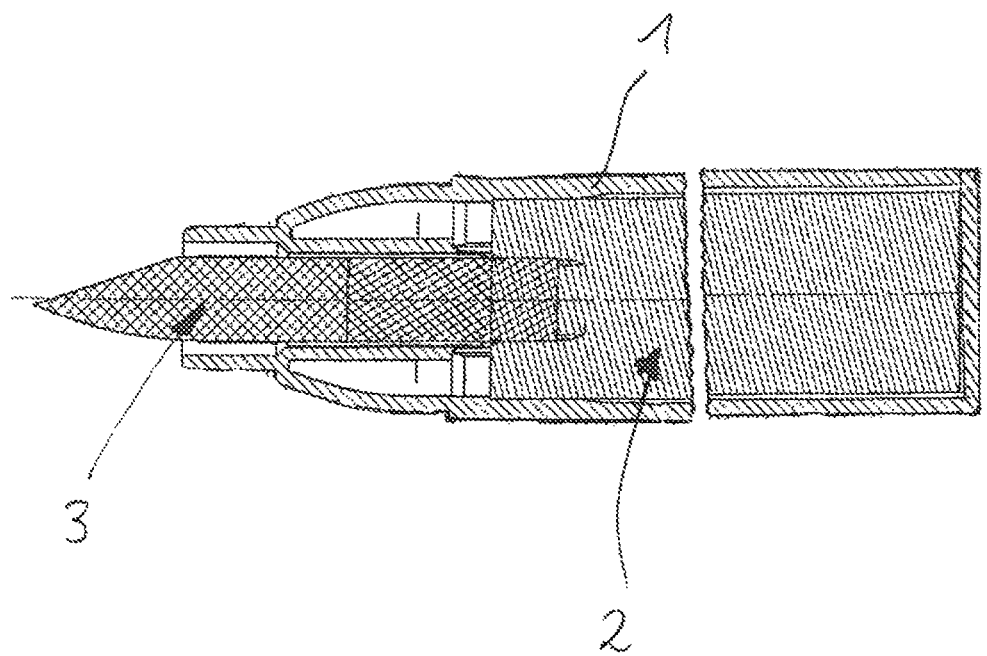

WRITING, MARKING AND/OR DRAWING LIQUID FOR CAPILLARY SYSTEMS, ESPECIALLY FOR APPLICATOR IMPLEMENTS HAVING A CAPILLARY SYSTEM, AND APPLICATOR IMPLEMENT

CROSS-REFERENCE TO RELATED APPLICATION

This application claims the priority, under 35 U.S.C. § 119, of European application EP 19151443, filed Jan. 11, 2019; the prior application is herewith incorporated by reference in its entirety.

BACKGROUND OF THE INVENTION

Field of the Invention

The invention relates to a gray to black, aqueous writing, marking and/or drawing liquid for capillary systems, especially for applicator implements having a capillary system, and to an applicator implement in which a writing, marking and/or drawing liquid of this kind is used.

Colored writing, marking and/or drawing liquids with colorants which are used in applicator implements having capillary systems are known. Also long known is the use of aqueous writing, marking and/or drawing liquids, or inks, for application to paper. Colorants used are customarily dyes, such as anionic dyes, for example, or else colored pigments. They are stabilized by means of binders and/or surfactants in the writing, marking and/or drawing liquid which is intended for use in capillary systems.

In order to ensure sufficient application, liquids used in capillary systems have to possess very low viscosities of less than 50 mPas, but preferably less than 20 mPas (Brookfield, 20° C., cone-plate CPE-40). Applicator implements in which such writing, marking and/or drawing liquids are used contain a shaft, typically a plastic or metal housing, onto which a closure cap is pushed when the implement is not in use. Disposed within the shaft is a reservoir for the writing, marking and/or drawing liquid, made from a capillary material, such as from polyester fibers or polyolefin fibers, for example, and this reservoir is in fluid communication with an applicator element or a writing, marking or drawing tip, made from a likewise capillary material, such as a fiber tip or sintered tip, for example, so that the writing, marking and/or drawing liquid can be transported from the reservoir to the tip of the applicator element by virtue of adhesion forces and/or the capillary effect.

Furthermore, for more than 200 years there have already been graphite leads in existence, for which graphite and clay are mixed, extruded, dried, and subsequently baked at around 1,000° C. The resulting graphite lead is subsequently impregnated with oils or waxes. The hardness of this lead is critically influenced by the mixing ratio between graphite and clay. The higher the proportion of graphite, the softer and "blacker" the lead.

BRIEF SUMMARY OF THE INVENTION

It is an object of the invention to specify writing, marking and/or drawing liquid for capillary systems, more particularly for applicator implements with capillary systems, which allows applied traces in various gray shades to be produced with different proportions of graphite in the liquid. A further object of the invention is to specify an applicator implement, more particularly an applicator implement having a capillary system, in which the writing, marking and/or drawing liquid is employed.

The object is achieved with an aqueous writing, marking and/or drawing liquid, more particularly a gray to black writing, marking and/or drawing liquid, for capillary systems, more particularly for applicator implements having a capillary system, with the features as claimed in the independent liquid claim. The aqueous writing, marking and/or drawing liquid has a viscosity of less than 50 mPas, more particularly less than 20 mPas (Brookfield, 20° C., cone-plate CPE-40), and contains a wetting agent and graphite having a carbon content of between 95 and 99.9 wt %, having an ash content of between 0.1 and 5 wt %, and having a particle size ≤20 µm at D90. The aqueous writing, marking and/or drawing liquid further contains at least one release agent, more particularly in a concentration of 2 to 15 wt %, the release agent containing barium sulfate and/or an aqueous, highly mobile, nonsedimenting colloidal dispersion of nanoparticulate silicon dioxide particles.

The writing, marking and/or drawing liquid is therefore a water-based ink which contains graphite and whose applied traces exhibit gray shades having different intensities and having a graphitelike luster. Consequently the different degrees of hardness, comparably to those of conventional solid graphite leads, can also be represented with aqueous inks. Furthermore, the applied traces exhibit high erasability on paper, comparable with that of solid graphite leads. With a graphite particle size of ≤20 µm at D90, moreover, assurance is provided that the capillary channels do not clog.

The wetting agent is added to establish the desired viscosity and also for reducing the surface tension to preferred ranges of between 25 to 40 mN/m. The low viscosity <50 mPas, and preferably in fact <20 mPas, of the writing, marking and/or drawing liquid enables it to be applied by way of capillary systems.

To lessen the likelihood of agglomeration and sedimentation of the graphite particles used, at least one release agent is added to the aqueous writing, marking and/or drawing liquid. A concentration of 2 to 15 wt % in particular has proven ideal. The release agent is more particularly a finely divided, stabilized barium sulfate. An example that may be given here is the release agent sold under the tradename Spacer Concept—N (SC-90-NC)[6], whose specification is as follows:
a) Shelf life: 40° C.>6 weeks
b) Density: 1.15 g/ml
c) pH: 9.2 to 10.2
d) Viscosity: <3500 mPas
e) Solids content: 40-42%.

In addition or as an alternative to the barium sulfate it is also possible in particular to use aqueous, highly mobile, nonsedimenting colloidal dispersions of nanoparticulate silicon dioxide particles as release agents. Particularly deserving of recommendation in this regard are release agents which are sold under the tradenames Borchi Coll 10[4] or Borchi Coil 20[5], whose specifications are as follows:
Borchi Coll 10:
a) Solids content: 30-31%
b) Density (20° C.; DIN 51757) 1.205-1.213 g/cm$^3$
c) Viscosity (20° C.; DIN 53015): max. 7 mPas
d) pH (DIN 19268): 9.50-10.50
e) Titrated BET surface area: 280-320 m$^2$/g
f) Na$_2$O content: 0.30-0.40%.
Borchi Coll 20:
a) Solids content: 30-31%
b) Density (20° C.; DIN 51757) 1.202-1.210 g/cm$^3$ c) Viscosity (20° C.; DIN 53015): max. 5 mPas
d) pH (DIN 19268): 8.50-9.50
e) Titrated BET surface area: 180-220 m²/g
f) Na₂O content: 0.12-0.18%.

Specifically, with the use of the stated release agents, there was barely any sedimentation observed on the part of the graphite particles, and the shelf life exhibited by the aqueous writing, marking and/or drawing liquid is very good. As a result it can be used over a prolonged period in applicator implements with a capillary system, without disruptive deposits within the capillary system that may clog the capillary channels.

In a multiplicity of tests it emerged in particular that a graphite fraction in the range from 1 to 30 wt % was suitable in the writing, marking and/or drawing liquid. Particularly preferred for use is graphite having a proportion of 5 to 20 wt % within the aqueous writing, marking and/or drawing liquid.

Furthermore, in particular, a graphite type having a carbon content of between 96 and 97 wt %, an ash content of between 3 to 4 wt %, and a particle size <20 µm at D90, with a particle size distribution of at least 99.9%<40 µm, has proven to be highly suitable. Outstanding results, especially in terms of the trace characteristics, have been achieved, moreover, when using a graphite having a carbon content of between 98.5 and 99.5 wt %, an ash content of between 0.1 to 0.5 wt %, and a particle size <10 µm at D90. The ash content was determined by a method according to DIN 51903, and the particle size distribution was ascertained by laser diffraction (Sympatex HELOS).

The recommended usage concentrations for the wetting agent are between 0.5 to 3 wt %. In this case the addition of a polyether-modified polysiloxane as wetting agent has proven to be suitable. Particularly suitable in this context is the additive sold under the tradename Abil B 8851[1] and having the following specification in particular:
a) Viscosity (dynamic; 25° C.; DIN 53019): 330-570 mPas
b) Density (25° C.; DIN 51757): 1.045-1.065 g/cm³

Additionally preferred is the use of one or more humectants, more particularly with a proportion of between 2 and 10 wt %, in order to improve the drying characteristics of the applied trace and to positively influence the flow properties of the writing, marking and/or drawing liquid in the capillary system. Examples that may be given here are urea, glycerol, and also relevant glycols, such as propylene glycol or butylene glycol, for example.

It has further proven to be advantageous if the writing, marking and/or drawing liquid is admixed with preservatives, more particularly in a concentration of between 0.2 to 2.5 wt %. Examples of preservatives which are usefully added individually or in combination are phenoxyethanol and/or caprylyl glycol, and also formaldehyde donors or isothiazolinones (methylisothiazolinone (MIT), chloromethylisothiazolinone (CIT), benzisothiazolinone (BIT) or octylisothiazolinone (OIT)). One suitable preservative representing a formaldehyde donor is available under the tradename ACTICIDE SR 7034[2], for example. Another suitable preservative, an isothiazolinone-based biocide, which comprises 2-bromo-2-nitropropane-1,3-diol and 2-octyl-2H-isothiazol-3-one, is available under the tradename ACTICIDE LT2[3], for example.

In the case of one preferred embodiment, the writing, marking and/or drawing liquid contains not only graphite but also amorphous carbon, more particularly with a proportion of between 0.1 and 8 wt %. By adding the amorphous carbon—an example that may be given here is carbon black, Hostafine Black T[7]—it is possible to increase the blackness of the writing, marking and/or drawing liquid. This is especially recommended for obtaining high blackness, to imitate hardnesses 6B to 10B, for example.

In one advantageous embodiment, the writing, marking and/or drawing liquid contains at least one dye and/or at least one color pigment. The addition of the at least one dye and/or of the at least one color pigment is made more particularly in a concentration of 0.1 to 5 wt %.

To deepen the blackness it is possible in particular to use small amounts of at least one blue dye, such as patent blue, for example, and/or of at least one blue pigment, such as ultramarine or phthalocyanine blue, for example, at low percentages of between 0.1 to max. 5 wt %.

If a dye or color pigment is added to the writing, marking and/or drawing liquid, graphite-gray applied traces are produced from which the graphite attaching at the surface can be removed by erasing, leaving behind the dye used or the color pigment used, as application on paper. Where a blue dye is used, Acid Blue 9, CI 42090 for example, in low concentrations together with graphite in the aqueous writing, marking and/or drawing liquid, the possibility is provided, for example, of a graphitelike lustrous applied trace of color on paper. After the graphite components have been removed by erasing, a color change to blue takes place. The use of other dyes, especially anionic dyes in yellow, red, green and other shades, is also possible in this context. As an alternative, any desired color pigments can also be used.

The remaining part of the composition of the writing, marking and/or drawing liquid is accounted for by demineralized water, which is used as solvent. More particularly, demineralized water is present in a concentration of 60 to 90 wt %, more preferably in a concentration of 70 to 85 wt %.

The aqueous writing, marking and/or drawing liquid is used in an applicator implement, more particularly an applicator implement having a capillary system. For this purpose, the applicator implement, more particularly a writing, marking or drawing implement, has an embodiment having the features as claimed in the independent applicator implement claim, and contains a writing, marking or drawing tip made of a capillary material, and a reservoir which is made of a capillary material and contains an aqueous writing, marking and/or drawing liquid having the properties described above.

Other features which are considered as characteristic for the invention are set forth in the appended claims.

Although the invention is illustrated and described herein as embodied in a writing, marking and/or drawing liquid for capillary systems, especially for applicator implements having a capillary system, and an applicator implement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, longitudinal sectional view of a capillary applicator implement according to the invention.

DETAILED DESCRIPTION OF THE INVENTION

Referring now to the FIGURE of the drawings in detail, there is shown an applicator implement that is substantially pen-shaped and has a shaft 1 in which there is a reservoir 2 made of a capillary material, or a fiber reservoir of low density, such as a polyester fiber reservoir, for example. The front end of the pen carries a writing tip 3 made of a capillary material, or a fiber tip, which at its rear end communicates with and/or projects into the fiber reservoir 2.

The manufacture of the aqueous writing, marking and/or drawing liquid takes place predominantly in mixing tanks, in which the constituents of the writing, marking and/or drawing liquid are added. In this case, all the while, stirring tools provide for stirring in order to mix the individual components thoroughly with one another and to distribute them with sufficient uniformity. The resultant writing, marking and/or drawing liquid is subsequently introduced into the capillary-material reservoir 2 of the above-described writing implement.

The tests were carried out with application of the writing, marking and/or drawing liquid to paper by means of the applicator implement. The applied trace was subsequently compared with those of conventional baked solid graphite leads, and evaluated for its gray shade. Another parameter tested was the erasability.

Indicated below are five example formulations of writing, marking and/or drawing liquids. The values in the example formulations in percent by weight are based in each case on the total mass of the writing, marking and/or drawing liquid.

Example 1

Example formulation of a black writing, marking and/or drawing liquid corresponding to a moderate hardness (hardness HB/F), having a viscosity of 3.0 mPas (Brookfield, 20° C., cone-plate CPE-40):

| | |
|---|---|
| Abil B 8851[1] | 2.5 wt % |
| Acticide SR 7034[2] | 0.5 wt % |
| Acticide LT2[3] | 0.5 wt % |
| Glycerol | 2.5 wt % |
| Borchi Coll 10[4] | 5.0 wt % |
| Graphite (carbon content 96-97 wt %, d90 < 20 μm) | 5.0 wt % |
| Water, demineralized | 84.0 wt % |

Example 2

Example formulation of a dark gray writing, marking and/or drawing liquid having a graphitic luster and a viscosity of 4.0 mPas (Brookfield, 20° C., cone-plate CPE-40):

| | |
|---|---|
| Abil B 8851[1] | 1.0 wt % |
| Acticide SR 7034[2] | 0.4 wt % |
| Acticide LT2[3] | 0.3 wt % |
| Borchi Coll 20[5] | 5.0 wt % |
| Graphite (carbon content around 99 wt % d90 < 10 μm) | 12.0 wt % |
| Water, demineralized | 81.3 wt % |

Example 3

Example formulation of a jet black writing, marking and/or drawing liquid which has a graphitic luster and which—with a coarse-pored capillary tip—corresponds to a very soft hardness (hardness 9B) with a viscosity of 5.0 mPas (Brookfield, 20° C., cone-plate CPE-40):

| | |
|---|---|
| Abil B 8851[1] | 2.0 wt % |
| Caprylyl glycol | 1.0 wt % |
| Phenoxyethanol | 1.0 wt % |
| Propylene glycol | 4.0 wt % |
| Spacer Concept - N (SC-90-NC)[6] | 5.0 wt % |
| Graphite (around 99% carbon, d90 < 10 μm) | 8.0 wt % |
| Carbon black, Hostafine Black T[7] | 5.0 wt % |

Water, demineralized 74.0 wt %

An amorphous carbon, specifically in the form of carbon black, was added in the case of the writing, marking and/or drawing liquid of example 3. This significantly increased the blackness of the applied trace.

Example 4

Example formulation of a graphite-colored writing, marking and/or drawing liquid comprising a water-soluble anionic dye and having a viscosity of 3.5 mPas (Brookfield, 20° C., cone-plate CPE-40):

| | |
|---|---|
| Abil B 8851[1] | 2.0 wt % |
| Caprylyl glycol | 0.5 wt % |
| Phenoxyethanol | 1.0 wt % |
| Propylene glycol | 4.0 wt % |
| Borchi Coll 10[4] | 4.0 wt % |
| Graphite (carbon content around 99 wt %, d90 < 10 μm) | 10.0 wt % |
| Acid Blue 9 dye, CI42090 | 1.5 wt % |
| Water, demineralized | 77.0 wt % |

A writing, marking and/or drawing liquid having a composition in accordance with example 4 gives a graphite-gray shimmer after application, corresponding approximately to a hardness 4B. After initial drying on commercial-standard paper, the applied trace or graphite layer was removed using an eraser. This left a blue application of color with the shade of the blue dye used.

Example 5

Example formulation of a graphite-colored writing, marking and/or drawing liquid comprising a color pigment and having a viscosity of 3.5 mPas (Brookfield, 20° C., cone-plate CPE-40):

| | |
|---|---|
| Abil B 8851[1] | 2.0 wt % |
| Caprylyl glycol | 0.5 wt % |
| Phenoxyethanol | 1.0 wt % |
| Propylene glycol | 4.0 wt % |
| Borchi Coll 10[4] | 4.0 wt % |
| Graphite (carbon content around 99 wt %, d90 < 10 μm) | 10.0 wt % |
| Hostafine Blue B2G[8] | 1.5 wt % |
| Water, demineralized | 77.0 wt % |

A writing, marking and/or drawing liquid having a composition in accordance with example 5 gives a likewise graphite-gray shimmer after application (corresponding to hardness 4B). After initial drying on commercial-standard paper, the applied trace or graphite layer was again removed using an eraser, to leave a blue application of color.

Manufacturers:
1) Evonik Industries AG, Goldschmidtstr. 100, 45127 Essen, Germany
2), 3) Thor GmbH, Landwehrstraße 1, 67346 Speyer, Germany
4), 5) OMG Borchers GmbH, Berghausener Str. 100, 40764 Langenfeld, Germany
6) Hemmelrath Technologies, Dr.-Gammert-Str. 3, 63906 Erlenbach, Germany
7), 8) Clariant Produkte GmbH, Industriepark Hochst, 65926 Frankfurt a.M., Germany

The invention claimed is:

1. An aqueous writing, marking and/or drawing liquid for capillary systems, the aqueous writing, marking and/or drawing liquid having a viscosity of less than 50 mPas (Brookfield, 20° C., cone-plate CPE-40), the aqueous writing, marking and/or drawing liquid comprising:
   a wetting agent;
   graphite having a carbon content of between 95 and 99.9 wt %, an ash content of between 0.1 and 5 wt %, and a particle size ≤20 μm at D90; and
   at least one release agent having barium sulfate and/or an aqueous, highly mobile, nonsedimenting colloidal dispersion of nanoparticulate silicon dioxide particles.

2. The aqueous writing, marking and/or drawing liquid according to claim 1, wherein said graphite is present with a proportion of 1 to 30 wt %.

3. The aqueous writing, marking and/or drawing liquid according to claim 1, wherein said graphite has said carbon content of between 96 and 97 wt %, said ash content of between 3 to 4 wt %, and said particle size <20 μm at D90.

4. The aqueous writing, marking and/or drawing liquid according to claim 1, wherein said graphite has said carbon content of between 98.5 and 99.5 wt %, said ash content of between 0.1 to 0.5 wt %, and said particle size <10 μm at D90.

5. The aqueous writing, marking and/or drawing liquid according to claim 1, wherein said wetting agent is present in a concentration of 0.5 to 3 wt %.

6. The aqueous writing, marking and/or drawing liquid according to claim 1, wherein said wetting agent has a polyether-modified polysiloxane.

7. The aqueous writing, marking and/or drawing liquid according to claim 1, further comprising at least one humectant.

8. The aqueous writing, marking and/or drawing liquid according to claim 1, further comprising at least one preservative.

9. The aqueous writing, marking and/or drawing liquid according to claim 1, further comprising amorphous carbon.

10. The aqueous writing, marking and/or drawing liquid according to claim 1, further comprising at least one dye and/or at least one color pigment.

11. The aqueous writing, marking and/or drawing liquid according to claim 10, wherein at least one of said at least one dye or said at least one color pigment is present in a concentration of 0.1 to 5 wt %.

12. The writing, marking and/or drawing liquid according to claim 10, wherein said dye comprises an anionic dye.

13. The aqueous writing, marking and/or drawing liquid according to claim 1, wherein:
   the aqueous writing, marking and/or drawing liquid is for applicator implements having a capillary system;
   said viscosity is less than 20 mPas (Brookfield, 20° C., cone-plate CPE-40); and
   said at least one release agent is in a concentration of 2 to 15 wt %.

14. The aqueous writing, marking and/or drawing liquid according to claim 1, wherein said graphite is present with a proportion of 5 wt % to 20 wt %.

15. The aqueous writing, marking and/or drawing liquid according to claim 7, wherein said humectant is present with a proportion of between 2 and 10 wt %.

16. The aqueous writing, marking and/or drawing liquid according to claim 8, wherein said at least one preservative is in a concentration of not more than 0.2 to 2.5 wt %.

17. The aqueous writing, marking and/or drawing liquid according to claim 9, wherein said amorphous carbon is in a proportion of between 0.1 and 8 wt %.

18. An applicator implement, comprising:
   a writing, marking or drawing tip made of a capillary material;
   an aqueous writing, marking and/or drawing liquid having a viscosity of less than 50 mPas (Brookfield, 20° C., cone-plate CPE-40), said aqueous writing, marking and/or drawing liquid containing a wetting agent, graphite having a carbon content of between 95 and 99.9 wt %, an ash content of between 0.1 and 5 wt %, and a particle size ≤20 μm at D90 and at least one release agent having barium sulfate and/or an aqueous, highly mobile, nonsedimenting colloidal dispersion of nanoparticulate silicon dioxide particles; and
   a reservoir made of said capillary material and containing said aqueous writing, marking and/or drawing liquid.

* * * * *